United States Patent [19]
Longton et al.

[11] 3,993,540
[45] Nov. 23, 1976

[54] HELIUM COOLED NUCLEAR REACTORS

[75] Inventors: Peter Bryan Longton, Lymm; Henry Chapman Cowen, Sale, both of England

[73] Assignee: United Kingdom Atomic Energy Authority, London, England

[22] Filed: Jan. 13, 1975

[21] Appl. No.: 540,392

[30] Foreign Application Priority Data
Feb. 1, 1974 United Kingdom.............. 4870/74

[52] U.S. Cl................................. 176/37; 176/38; 176/60
[51] Int. Cl.²........................................ G21C 19/32
[58] Field of Search.................... 176/37, 38, 60

[56] References Cited
UNITED STATES PATENTS

| | | |
|---|---|---|
| 3,039,948 | 6/1962 | Krucoff.................... 176/37 |
| 3,108,051 | 10/1963 | Lindstrom................. 176/92 X |
| 3,203,866 | 8/1965 | Lehmer et al............. 176/37 |

FOREIGN PATENTS OR APPLICATIONS

| | | | |
|---|---|---|---|
| 1,381,937 | 2/1964 | France................... | 176/38 |
| 2,061,573 | 6/1971 | France................... | 176/37 |
| 1,273,080 | 7/1968 | Germany................. | 176/37 |
| 906,896 | 9/1962 | United Kingdom........ | 176/92 R |
| 1,202,252 | 8/1970 | United Kingdom........ | 176/37 |

OTHER PUBLICATIONS

Manhart et al., *Duty & Design of Gas–Cleaning Plant for High-Temp. Thorium Reactor*, BBC Nachr (Germany), vol. 53, No. 1–2, Jan.–Feb. '71, pp. 32–36.

*Primary Examiner*—Samuel Feinberg
*Assistant Examiner*—Peter A. Nelson
*Attorney, Agent, or Firm*—Larson, Taylor and Hinds

[57] ABSTRACT

A closed loop coolant circuit for a helium cooled high temperature reactor. The circuit has a conventional purification by-pass loop including an oxidizing bed for impurities and an absorption bed for the oxidized impurities. A recycle pipe line is provided whereby a fraction of wet gas leaving the oxidizing bed is returned to the main coolant circuit.

8 Claims, 5 Drawing Figures

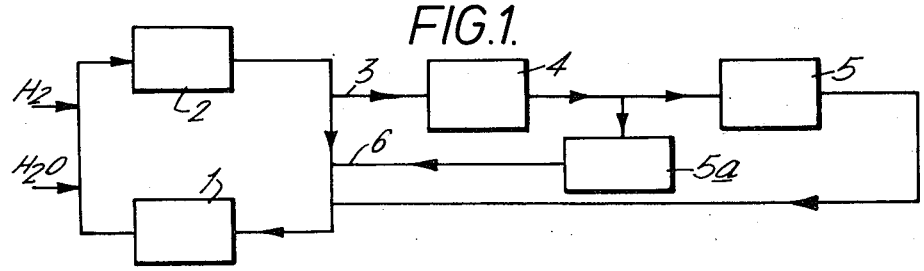
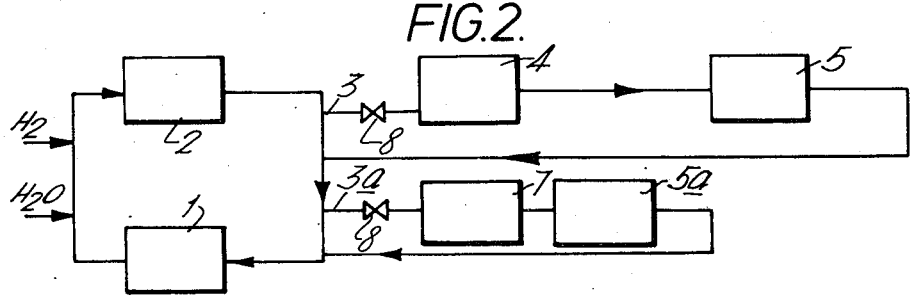
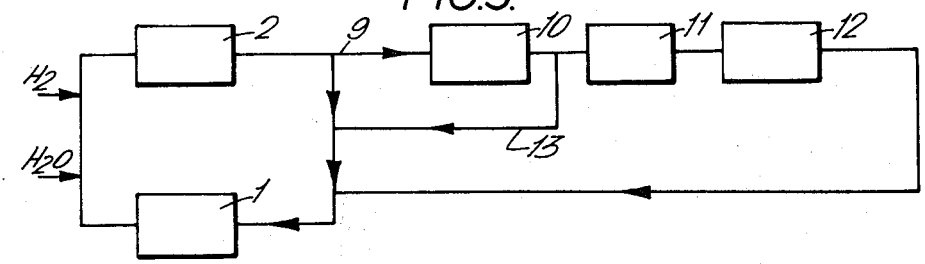
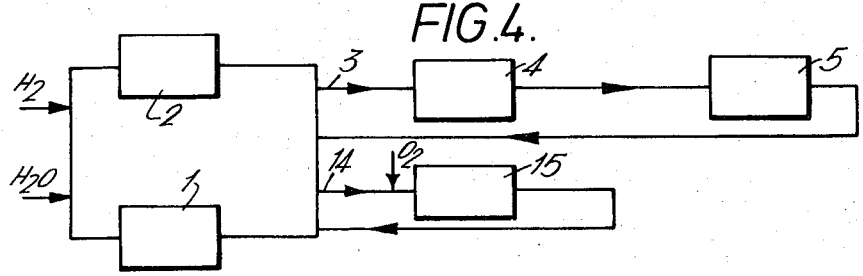
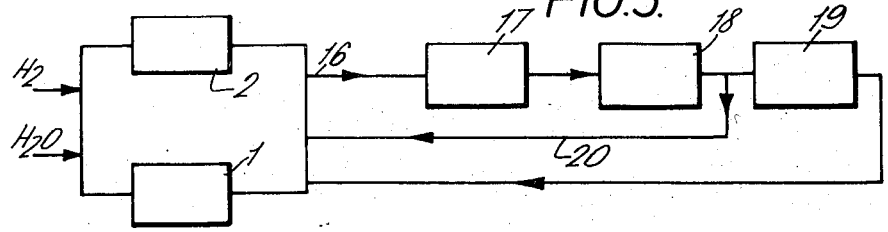

HELIUM COOLED NUCLEAR REACTORS

BACKGROUND OF THE INVENTION

This invention relates to helium cooled nuclear reactors and is mainly concerned with reactors of the kind known as high temperature reactors (HTR).

A helium cooled high temperature reactor may comprise a mass of graphite moderator embodying nuclear fuel and through which the gas coolant is passed in heat exchange with the fuel. The coolant leaves the reactor core at approximately 750° C. A typical closed loop coolant circuit comprises the nuclear reactor core and a boiler unit wherein steam is generated by heat exchange with the coolant gas. The helium circuit of an HTR contains small quantities (for example a few parts per million) of impurities, for example, hydrogen, methane, carbon monoxide and water which, to some extent, arise from inleakage of water and hydrogen from the boiler unit. It is desirable to minimise the level of impurities in the coolant and the impurities are usually kept to tolerable values by circulating a fraction of the gas through a purification by-pass loop. The by-pass loop comprises an oxidising bed and an absorption bed for removing the oxidised species. However, impurities cannot be entirely eliminated and, owing to the fact that the water content of the gas is inherently low (because of the affinity of high temperature graphite for water) the ratio of hydrogen to water is generally high. Such a high ratio can be disadvantageous, by preventing, for example, the formation of oxide films on mild steel components. Although the ratio can be reduced by injection of water, this raises the absolute levels of both hydrogen and carbon monoxide. These side effects are undesirable, the hydrogen for example giving rise to additional methane which can lead to carburisation of the circuit materials. The additional graphite loss arising from water injection is also undesirable.

SUMMARY OF THE INVENTION

According to the invention, a helium cooled, graphite moderated, nuclear reactor having a main coolant gas circuit and a coolant gas purification means where the purification means contains oxidizing means for oxidizing the coolant gas; means for conveying a fraction of the main coolant stream to the oxidizing means to convert hydrogen and carbon monoxide present in the gas to water and carbon dioxide; means for removing carbon dioxide from at least a portion of the gas leaving the oxidizing means; means for conveying at least a portion of the gas leaving the oxidizing means to the carbon dioxide removing means to remove carbon dioxide therefrom; means for conveying at least a portion of the gas leaving the carbon dioxide removing means to the main coolant circuit; and means for conveying at least a portion of the gas leaving the oxidizing means to the main coolant circuit to introduce water-containing coolant gas thereto.

The invention provides that a proportion of the water formed in the by-pass loop by oxidation of hydrogen is returned to the main circuit instead of being removed by an absorption bed. The hydrogen/water ratio is thereby reduced without substantially increasing the hydrogen level in the reactor coolant circuit and with a smaller penalty on graphite loss than would arise from water injection.

Preferably, the recycled wet gas is passed through an absorption bed for the removal of carbon dioxide.

DESCRIPTION OF THE DRAWINGS

Examples of coolant circuits for gas cooled nuclear reactors embodying the invention will now be described, by way of example, with reference to the accompanying diagrammatic drawings, comprising FIGS. 1 to 5 which illustrate alternative arrangements.

DESCRIPTION OF THE PREFERRED EMBODIMENT

In FIG. 1 there is shown a closed loop coolant circuit including a high temperature reactor core 1 and a boiler unit 2. Injection of hydrogen and water impurities are diagrammatically shown, such impurities stemming partly from water leakage into the circuit from the boiler unit. Helium gas flowing within the closed loop has other impurities including, for example, carbon monoxide which stems from the reaction of water with the graphite. The coolant circuit has a purification by-pass loop 3 whereby a fraction of coolant is circulated successively through an oxidising bed 4 of copper oxide and an absorption bed 5 of silica gel or activated carbon or a molecular seive. The oxidised hydrogen and carbide monoxide impurities are absorbed in the bed 5 and the substantially dry carbon dioxide free gas is returned to the coolant circuit. In accordance with the invention there is means for recycling wet gas from the oxidising bed 4 to the main coolant circuit the means comprising a line 6 including an absorption bed 5a comprising a molecular seive. Thus a fraction of the hydrogen gas content of the coolant gas is converted to water and returned to the circuit thereby reducing the hydrogen/water ratio without increase of the absolute hydrogen level in the circuit. The reduced hydrogen/water ratio reduces interactions of the coolant with the circuit materials. The oxidised carbon monoxide content of the fraction of gas is absorbed by the molecular seive.

In FIG. 2 there is shown an alternative arrangement including a by-pass loop 3 and a by-pass loop 3a. A first fraction of coolant is circulated through by-pass loop 3 by way of an oxidising bed 4 of copper oxide and an absorption bed 5 of molecular seive as in the previously described embodiment shown in FIG. 1. A second fraction of coolant is circulated through the by-pass loop 3a which includes an oxidising bed 7 of copper oxide and a carbon dioxide absorption bed 5a, of lesser capacities than the beds 4 and 5. The loops each have independent flow control means 8 so that it is possible to oxidise the hydrogen and a variable proportion of the carbon monoxide, by adjusting the temperature of the bed 7. Thus some control over the carbon monoxide and carbon dioxide concentrations can be made without disturbing the primary coolant hydrogen and water levels.

In the arrangement shown in FIG. 3 a by-pass loop 9 has two oxidising beds 10, 11 and an absorption bed 12 in series and there is a line 13 for recycling a proportion of the wet (partly oxidised) gas leaving the bed 10 to the main coolant circuit. Although a small proportion of the carbon monoxide content of the gas circulating loop 9 is converted to carbon dioxide and recycled with some carbon monoxide to the main coolant circuit by way of line 13, the major proportion of the carbon monoxide content of the by-pass fraction is converted to dioxide in the bed 11 and is absorbed in the bed 12.

In the arrangement shown in FIG. 4 there are two independent by-pass loops 3, 14. The loop 3 is identical to the loop 3 of FIG. 1 but the loop 14 includes a catalyst bed 15, such as, for example supported platinum. Oxygen is injected over the bed 15 to react preferentially with the hydrogen thereby leaving the carbon monoxide unconverted.

In FIG. 5 a by-pass loop 16 has, in series, an oxidising bed 17 of copper oxide, an absorption bed 18 of molecular seive for absorbing carbon dioxide, and an absorption bed 19 of molecular seive for water. A line 20 recycles a proportion of the wet (but substantially carbon dioxide free) by-pass gas leaving the bed 18 to the main coolant circuit.

The embodiments shown in FIGS. 1 to 5 refine the recirculation process according to the invention by providing flexible control over the coolant composition. Such control can be utilised to:

1. boost the water concentration without substantially increasing the hydrogen or carbon monoxide levels,
2. control the carbon monoxide concentration independently of the hydrogen and water levels,
3. suppress the recirculation of carbon dioxide, and
4. effect a smaller penalty regarding the graphite loss which might arise from water injection to the circuit.

The arrangement shown in FIG. 2 is relatively simple and is preferred at this time because of its flexibility and ease of control. It possesses a further attractive feature in that it can be used to provide an additional unit for the removal of oxygen during initial clean-up of coolant following an extended shut down. This is effected by first reducing copper oxide (of the oxidising bed) to copper with hydrogen.

We claim:
1. A helium cooled, graphite moderated, nuclear reactor having a main coolant gas circuit and a coolant gas purification means, said purification means comprising:
   a. oxidizing means for oxidizing impurities in the coolant gas;
   b. means for conveying a fraction of the main coolant stream to said oxidizing means to convert hydrogen and carbon monoxide present in said gas to water and carbon dioxide;
   c. means for removing carbon dioxide from at least a portion of the gas leaving said oxidizing means;
   d. means for conveying at least a portion of the gas leaving said oxidizing means to said carbon dioxide removing means to remove carbon dioxide therefrom;
   e. means for conveying at least a portion of the gas leaving said carbon dioxide removing means to said main coolant circuit; and
   f. means for conveying at least a portion of the gas leaving said oxidizing means to said main coolant circuit to introduce water-containing coolant gas thereto.
2. A helium cooled nuclear reactor according to claim 1 wherein the purification means further comprises:
   g. means for removing water from a portion of the gas leaving said oxidizing means;
   h. means for conveying at least a portion of the gas leaving said carbon dioxide removing means to said water removing means; and
   i. means for conveying said gas leaving said water removing means to said main coolant circuit.
3. A helium cooled nuclear reactor according to claim 1 wherein the purification means further comprises:
   j. means for further oxidizing at least a portion of the impurities in the coolant gas;
   k. means for conveying a portion of the gas leaving said oxidizing means to said further oxidizing means; and
   l. means for conveying said gas from said further oxidizing means to said carbon dioxide removing means.
4. A helium cooled nuclear reactor according to claim 1 wherein the purification means comprises:
   a. a first loop including:
      i. oxidizing means for oxidizing impurities in the coolant gas;
      ii. means for conveying a fraction of the main coolant stream to said oxidizing means to convert hydrogen and carbon monoxide present in said gas to water and carbon dioxide;
      iii. means for removing carbon dioxide and water from the gas leaving said oxidizing means;
      iv. means for conveying the gas leaving said oxidizing means to said carbon dioxide and water removing means to remove carbon dioxide and water therefrom; and
      v. means for conveying the gas leaving said carbon dioxide and water removing means to said main coolant circuit;
   b. a second loop including:
      i. oxidizing means for oxidizing impurities in the coolant gas;
      ii. means for conveying a fraction of the main coolant stream to said oxidizing means to convert hydrogen and carbon monoxide present in said gas to water and carbon dioxide;
      iii. means for conveying the gas leaving said oxidation means to said main circuit to introduce water-containing coolant gas thereto.
5. A helium cooled nuclear reactor according to claim 4 wherein said second loop further comprises:
   iv. means for removing carbon dioxide from the gas leaving said oxidizing means;
   v. means for conveying said gas from said oxidizing means to said carbon dioxide removing means; and
   vi. means for conveying said gas from said carbon dioxide removing means to said main coolant circuit.
6. A helium cooled nuclear reactor according to claim 5 wherein the purification means further comprises means for controlling the gas flow rate to said first and second loops.
7. A helium cooled nuclear reactor according to claim 4 wherein said second loop comprises:
   i. oxidizing means comprising a chamber containing an oxidation catalyst and means for injecting oxygen into said chamber for the oxidizing of impurities in the coolant gas therein;
   v. means for conveying a fraction of the main coolant stream to said oxidizing means to convert hydrogen and carbon monoxide present in said gas to water and carbon dioxide; and
   vi. means for conveying said gas leaving said oxidizing means to said main coolant circuit.
8. A helium cooled nuclear reactor according to claim 7 wherein said catalyst is supported platinum.

* * * * *